Figure 1:
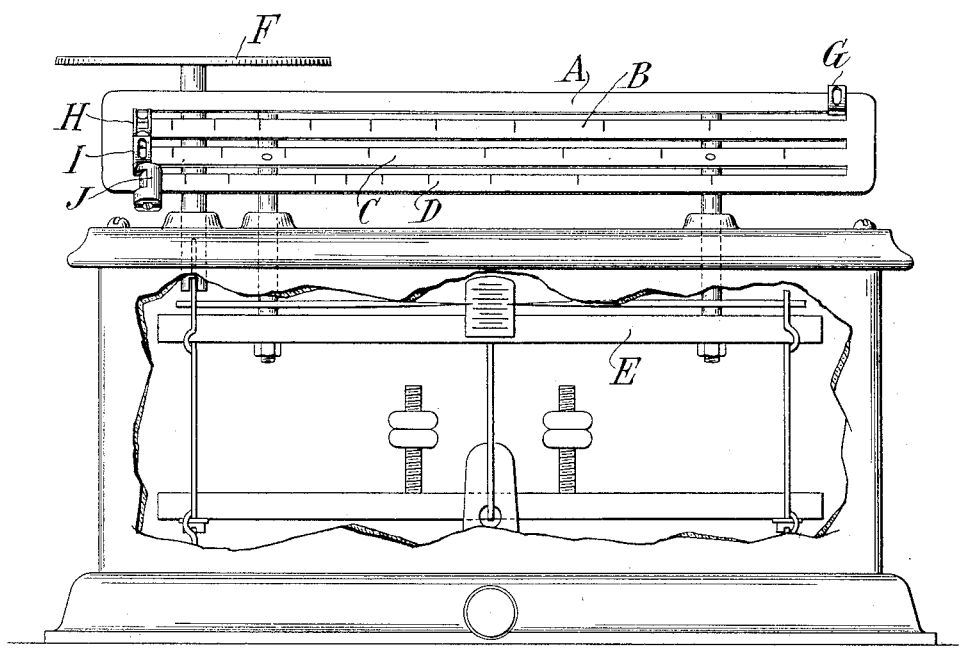

M. MÜNZNER.
WEIGHING SCALE.
APPLICATION FILED DEC. 26, 1913.

1,141,202.

Patented June 1, 1915.

WITNESSES:
René Bruine
Fred White

INVENTOR:
Max Münzner,
By Attorneys,
Fraser, Turk & Myers

UNITED STATES PATENT OFFICE.

MAX MÜNZNER, OF ARLINGTON, NEW JERSEY, ASSIGNOR TO THE TORSION BALANCE COMPANY, OF NEW YORK, N. Y., A CORPORATION OF NEW YORK.

WEIGHING-SCALE.

1,141,202.  Specification of Letters Patent.  Patented June 1, 1915.

Application filed December 26, 1913. Serial No. 808,850.

*To all whom it may concern:*

Be it known that I, MAX MÜNZNER, a citizen of the United States, residing at Arlington, in the county of Hudson and State of New Jersey, have invented certain new and useful Improvements in Weighing-Scales, of which the following is a specification.

This invention aims to provide certain improvements in weighing beams used on scales or balances for determining any fractional part of some given weight, or arrangements thereof as the occasion may require, as for instance in a yarn scale. A yarn scale is used for determining the size or number of a given sample of yarn, it being understood that the numbers of the different yarns bear an inverse relation to the weights of a standard length of yarn. For example, in cotton yarn the weight of a hank (of 840 yards) of No. 1 is 7000 grains; the weight of a hank of No. 2 is 3500 grains; and so forth, the weight of any number being 7000 grains divided by the number. In actual use a determined fraction of a hank, different for the different kinds of yarn as cotton, worsted, wool, etc., is weighed, the scales being proportioned accordingly. With cotton yarns one-seventh of a hank (120 yards) is weighed. The graduations for the higher numbers (as for Nos. 199 and 200) would be very fine on a simple scale beam as compared with the graduations for the smaller numbers (as 2, 3 and 4); the difference in weight between Nos. 199 and 200 being only 1/42 of a grain in 1/7 of a hank of cotton, and the difference between Nos. 2 and 3 being 166.7 grains. A simple beam with graduations of practicable spacing for the higher numbers would have to be of unwieldy length to take care of the total range of numbers.

This invention provides a simple means for weighing the entire range of numbers without the use of excessively long graduations for the smaller numbers or of excessively fine graduations for the greater numbers, and with a beam of moderate total length. A compound beam is used consisting of elements which are fractional portions of diverse theoretical beams of suitable lengths so that each element is of convenient length, such theoretical lengths being designed to establish the largest individual spacing or graduation for the predetermined actual length of the element; the graduation being preferably of the continually increasing or continually decreasing type. The graduations on each element of the compound beam correspond to only a certain section of the total range of weights or numbers for which the scale is designed. That is the numbers marked on different elements of the beam are not overlapping as in the common type of compound beam scales, but correspond to successive sections of the total range, the numbers on one section beginning at the point where those on the next lower section terminate; and the range of weights in the section covered by one element of the beam being greater than that covered by another element.

The accompanying drawings illustrate a scale embodying the invention.

Figure 2:
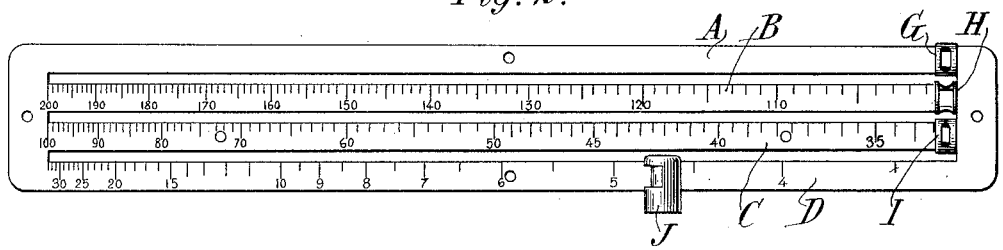
Figures 3, 4:
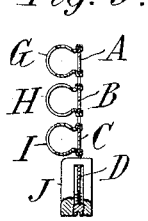

Figure 1 is a front elevation, partly broken away; Fig. 2 is a face view of the compound beam; Fig. 3 is a transverse section of the same with the weights thereon. Fig. 4 is a fragmentary elevation showing a different arrangement of the scale beam.

Referring to the embodiment of the invention illustrated, a compound beam consisting of elements A, B, C and D united at their ends so as to form mechanically a single member of the apparatus, is mounted upon the pivoted member E of an ordinary torsion balance, carrying at one end a scale pan F. My improved compound beam may be used in other styles of weighing apparatus and the mechanical construction of the compound beam may be varied in many different ways, each of the elements A, B, C and D being in effect a separate beam. The chief feature of invention lies in the graduating of the different beam elements, with suitably proportioned sliding weights for the different elements, and in the relations between the ranges of weights covered by the different elements.

The following example will make clear the nature of the graduations and the necessity of the same to permit a reasonably quick determination throughout the entire range of weights or numbers for which the scale is designed: A given length of beam, say 9 inches, is assumed. The numbers to be weighed are from number 3¼ to number 200; the weights ranging therefore from 1/200 to 1/3¼ of a given weight. On the 9-inch beam assumed the space between number 200 and number 199 would be only 1/4000 of an inch, and therefore practically useless.

This difficulty is overcome by splitting the total range into sections, three in the example illustrated, the first reading from number 200 to number 100 (weighing from 1/200 to 1/100), the second from number 100 to number 33⅓ (weighing from 1/100 to 1/33⅓=3/100), and the third from number 33⅓ to number 3⅓ (weighing from 1/33⅓=3/100 to 1/3⅓=3/10). The difference between the weights represented by the two extremes of each section therefore equalizes the established length of 9 inches. For the first section the 9 inches covers 1/200 of the assumed weight, for the next section the 9 inches covers 1/50, for the next section 27/100. A theoretical beam graduated according to the first section, where 9 inches corresponds to 1/200, and designed for the entire range of weights, would have to be 200 times 9, or 1800 inches long; similarly a beam for the total weights and proportioned like the second section would have to be 50 times 9 or 450 inches long; and a beam for the entire range and graduated in proportion to the third section would be 33⅓ inches long. But by dividing the total range into three separate sections, making the range of each section only such that the smallest spacing thereon is easily readable, and the smallest possible consistent with easy reading, the entire beam is reduced to a compact space. The range of weights to be measured may start at any point if means be provided for taking care of the missing value at the start. For example in the case illustrated numbers greater than 200 (fractions of the minimum weight from 1/200 down to 0) are not measured. An additional element of the beam A, however, is provided for balancing the first 1/200 of the weight. This may be classed as a tare weight, and the element A is a tare element which is blank.

The several sliding weights are proportioned to the graduations of their beams or beam elements. The weights are indicated at G, H, I and J. All the weights are shifted to the extreme left for adjusting the scale before use. Before weighing a piece of yarn the sliding weight or runner G is shifted to the extreme right on the beam element A as in Fig. 1. This compensates for the first yarn number 200 (being the 1/200 part), being the smallest size to be weighed on this particular scale. Smaller sizes are quite exceptional. The runner H on the second beam element B is then shifted to the right until the scale balances, or until it has been moved to the extreme right. In this position it compensates for the portion of the weight between 1/200 and 1/100. In the latter case the third runner I is shifted to the right on the beam element C until the scale balances, or until it reaches its extreme right hand position. In this position it compensates for the portion of the weight between 1/100 and 1/33⅓. If this is still not sufficient, shift the fourth runner J on the beam element D until the scale balances. This runner takes care of the portion of the weight from 1/33⅓ up to the total. This position of the runners is illustrated in Fig. 2. Thus it will be seen that the graduations on each beam element correspond to only a certain section of the total range, the ranges of the several beam elements being entirely separate, that is not overlapping.

Though I have described with great particularity of detail a certain specific embodiment of this invention, yet it is not to be understood therefrom that the invention is restricted to the particular embodiment disclosed nor to the particular application given as an example. Various modifications thereof in detail and in the arrangements of the parts and for varying purposes may be made by those skilled in the art without departure from the invention. As an example of one modification I have shown in Fig. 4 the three beam elements B' C' D' connected end to end, their slide weights or runners H' I' J' being limited each to traverse its own beam element. This is accomplished in construction shown by shifting the adjoining beam elements slightly out of line so that stop shoulders are formed for preventing the runner from moving too far. This arrangement is applicable where the increased length will not be inconvenient.

I claim as my invention:—

1. A scale for weighing samples of yarn or the like having a plurality of beam elements and suitable weights therefor, and having its elements graduated as separate sections of theoretical beams covering in succession the entire range desired, the empty scale being designed to balance with all the weights at the zero ends of their beam elements, and adapted to weigh from the lightest to the heaviest samples by sliding the weight on the first element to a balance or to its outermost position, and successively shifting the weights on the other elements in the same way until a balance is obtained, said elements being graduated to indicate successive numbers bearing inverse relations to the corresponding weights.

2. In a scale for weighing objects in terms of their fractional part of a given weight, a scale beam comprising a plurality of beam elements each graduated to represent a convenient section of a theoretical beam having inverse graduations extending from unity toward a fraction of infinite denominator representing zero weight, the scale beam elements representing successive sections of such beam and being graduated to different scales whereby they represent sections of such theoretical beams of different lengths, each section thus constituting a serial continuation of the next with its graduations of a different scale of magnitude, and slide weights on said beam elements respectively, the scale adapted to commence weighing the lightest object within its range with said slide weights at their least effective positions, and to weigh from the lightest to the heaviest objects within its range by sliding the weight on the first element to a balance or to its outermost position, and then (if necessary) sliding the weight on the next element in like manner, and so on, until the object is counterbalanced.

3. In a scale for weighing objects in terms of their fractional part of a given weight, a scale beam comprising a plurality of beam elements each graduated to represent a convenient section of a theoretical beam having inverse graduations extending from unity toward a fraction of infinite denominator representing zero weight, the scale beam elements representing successive sections of such beam and being graduated to different scales whereby they represent sections of such theoretical beams of different lengths, each section thus constituting a serial continuation of the next with its graduations of a different scale of magnitude, and slide weights on said beam elements respectively, the scale adapted to commence weighing the lightest object within its range with said slide weights at their least effective positions, and to weigh from the lightest to the heaviest objects within its range by sliding the weight on the first element to a balance or to its outermost position, and then (if necessary) sliding the weight on the next element in like manner, and so on, and means for counterpoising the weight of the lightest object within the range of the scale comprising a balance weight movable from a position for balancing the scale when empty to a position for weighing an object of such minimum weight.

In witness whereof, I have hereunto signed my name in the presence of two subscribing witnesses.

MAX MÜNZNER.

Witnesses:
C. A. MICHALIS,
JOSEPH W. HOBAN.

Copies of this patent may be obtained for five cents each, by addressing the "Commissioner of Patents, Washington, D. C."